United States Patent
Sattayatam et al.

(10) Patent No.: US 11,292,572 B2
(45) Date of Patent: Apr. 5, 2022

(54) AIRCRAFT DOOR WITH SLIDING DECOMPRESSION PANEL

(71) Applicant: SAFRAN CABIN INC., Huntington Beach, CA (US)

(72) Inventors: Panade Sattayatam, Huntington Beach, CA (US); Hai V. Tang, Bothell, WA (US)

(73) Assignee: SAFRAN CABIN INC., Huntington Beach, CA (US)

( * ) Notice: Subject to any disclaimer, the term of this patent is extended or adjusted under 35 U.S.C. 154(b) by 0 days.

(21) Appl. No.: 16/326,900

(22) PCT Filed: Jan. 31, 2019

(86) PCT No.: PCT/US2019/016111
§ 371 (c)(1),
(2) Date: Feb. 20, 2019

(87) PCT Pub. No.: WO2020/101728
PCT Pub. Date: May 22, 2020

(65) Prior Publication Data
US 2021/0380217 A1 Dec. 9, 2021

Related U.S. Application Data

(60) Provisional application No. 62/760,144, filed on Nov. 13, 2018.

(51) Int. Cl.
*B64C 1/14* (2006.01)
*B64D 45/00* (2006.01)
*B64C 1/00* (2006.01)

(52) U.S. Cl.
CPC ........ *B64C 1/1469* (2013.01); *B64D 45/0028* (2019.08); *B64C 2001/009* (2013.01)

(58) Field of Classification Search
CPC ... B64C 1/1469; B64C 2001/009; B64C 1/10; B64C 3/26; B64D 45/0028; B64D 1/00;
(Continued)

(56) References Cited

U.S. PATENT DOCUMENTS 8,806,807 B2   8/2014   Rees
9,114,869 B1   8/2015   Barrett
(Continued)

OTHER PUBLICATIONS

International Search Report and Written Opinion issued in PCT/US2019/01611.

*Primary Examiner* — Medhat Badawi
*Assistant Examiner* — Vicente Rodriguez
(74) *Attorney, Agent, or Firm* — Jeffer Mangels Butler & Mitchell LLP; Brandon C. Swain, Esq.

(57) ABSTRACT

A door assembly configured to be positioned between a first compartment and a second compartment that includes a main door portion having a first decompression opening defined therein, at least a first panel portion positioned in a first position within the first decompression opening, and a decompression sensor. The first panel portion is movable linearly between the first position and a second position and is pivotable between the second position and a third position. In the third position the first compartment is in fluid communication with the second compartment via the first decompression opening.

19 Claims, 9 Drawing Sheets

(58) Field of Classification Search
CPC .... B64D 1/06; E05F 17/00; E06B 9/04; B60J 10/80
See application file for complete search history.

(56) References Cited

U.S. PATENT DOCUMENTS

| | | | |
|---|---|---|---|
| 2003/0052227 A1* | 3/2003 | Pittman | B64C 1/1469 244/118.5 |
| 2003/0160130 A1* | 8/2003 | Novak | B64D 45/0028 244/129.5 |
| 2005/0082433 A1* | 4/2005 | Saku | B64D 45/0028 244/129.5 |
| 2005/0224649 A1* | 10/2005 | Tomiyama | B64D 45/0029 244/118.5 |
| 2006/0145007 A1* | 7/2006 | Melberg | B64D 45/0029 244/118.5 |
| 2008/0111025 A1 | 5/2008 | Saku | |
| 2010/0252679 A1* | 10/2010 | Sutthoff | B64C 1/1446 244/118.3 |

* cited by examiner

AIRCRAFT DOOR WITH SLIDING DECOMPRESSION PANEL

CROSS REFERENCE TO RELATED APPLICATIONS

This application is a national stage application, filed under 35 U.S.C. § 371, of International Patent Application No. PCT/US19/16111, filed on Jan. 31, 2019, which claims the benefit of U.S. Provisional Application No. 62/760,144, filed Nov. 13, 2018, the entireties of which are incorporated herein by reference.

FIELD OF THE INVENTION

The present invention relates generally to an armored aircraft door, and more particularly to an armored aircraft door with a slidable and rotatable decompression panel.

BACKGROUND OF THE INVENTION

The need has arisen to develop a decompression panel for an aircraft flight deck door that is preferably lighter and simpler to manufacture than the prior art. Commercial aircraft flight deck doors are required to provide a certain level of ballistic and intrusion threat resistance per FAA requirements. Flight deck doors are required to be compliant with decompression events during flight by either staying attached to aircraft structure under decompression loads or incorporating a decompression feature that allows venting between the flight deck and cabin to equalize pressure between the two compartments of the aircraft during a rapid decompression event. Today there are two known ways aircraft flight deck doors can meet these FAA requirements. First, the flight deck door unlocks during a decompression event and allows the flight deck door to open into the cockpit. Second, a decompression panel is installed in the flight deck door and a decompression latch releases allowing the decompression panel to open into the flight deck. However, this known technology is heavy and complex to manufacture.

SUMMARY OF THE PREFERRED EMBODIMENTS

In accordance with a first aspect of the present invention there is provided a door assembly configured to be positioned between a first compartment and a second compartment that includes a main door portion having a first decompression opening defined therein, at least a first panel portion positioned in a first position within the first decompression opening, and a decompression sensor. The first panel portion is movable linearly between the first position and a second position and is pivotable between the second position and a third position. In the third position the first compartment is in fluid communication with the second compartment via the first decompression opening. In a preferred embodiment, the first panel portion is configured to move from the first position to the second position when the decompression sensor senses a decompression event. Preferably, the first panel portion includes a free end and a pivot end. In the first position a gap is defined between the pivot end of the first panel portion and the main door portion, and in the second position the gap is reduced.

In a preferred embodiment, the first panel portion is configured to move from the second position to the third position due to the difference in pressure between the first and second compartments. Preferably, the door assembly includes a catch, and when the first panel portion moves from the first position to the second position the first panel portion clears the catch thereby allowing it to pivot from the second position to the third position. In a preferred embodiment, the first panel portion is biased toward the second position.

In a preferred embodiment, the door assembly includes a strap assembly that includes a strap having first and second opposite ends. The first end is secured to the main door portion (or a component that is secured to the main door portion) and the second end is secured to the first panel portion (or a component that is secured to the first panel portion). The strap maintains the first panel portion at an angle that is less than 90 degrees (e.g., 45 degrees or any angle between 1 degree and 89 degrees) when the first panel portion is in the third position.

In a preferred embodiment, the first panel portion is part of a first decompression panel assembly that includes a hinge assembly that includes an inner hinge portion and an outer hinge portion. The inner hinge portion is secured to the first panel portion and when the first panel portion moves from the first position to the second position, the inner hinge portion moves with the first panel portion and the outer hinge portion does not move. When the hinge assembly is included, the gap is defined between the pivot end of the first panel portion and the outer hinge portion. Preferably, when the first panel portion and inner hinge portion pivot from the second position to the third position, the outer hinge portion also pivots.

In accordance with another aspect of the present invention there is provided a method of providing pressure equalization between first and second compartments separated by a door assembly. The method includes obtaining the door assembly that includes a main door portion having a first decompression opening defined therein, at least a first panel portion and a decompression sensor. The first panel portion is positioned in a first position within the first decompression opening. The method also includes sensing a decompression event by the decompression sensor, sliding or moving the first panel portion slides to a second position, and pivoting the first panel portion to a third position such that the first compartment is in fluid communication with the second compartment via the first decompression opening.

In a preferred embodiment, the door assembly includes a catch, and the pivoting step occurs after the first panel portion clears the catch.

Flight deck doors that completely open for decompression into the cockpit require an electronic trigger latching system connected to an electronic decompression sensor which has stringent performance requirements and can be costly. Other decompression panels hinge at one panel end or towards the center of the decompression panel and are locked in a closed position by a decompression latch located at the opposite end of the hinge side. The decompression latch striker engages with the decompression panel and remains locked until a decompression event mechanically unlocks the latch allowing the decompression panel to open to equalized pressure in the aircraft. Under ballistic threat, the area where the decompression latch striker and decompression panel lock into place needs to be significantly armored in order to keep the latch from breaking or accidentally opening under a non-decompression scenario (bullet or intrusion strike only).

In the present invention, the decompression panel is nested in the flight deck door panel so to prevent the decompression panel opening under a non-decompression scenario such as a bullet strike or blunt force intrusion. In the present invention, the decompression panel, during normal aircraft operating conditions, is nested into or received in a cavity or bracket. This nesting locks the decompression panel into place and prevents unwanted movement of the decompression panel. Under a rapid decompression event, the decompression panel portion is released by a pressure sensitive latch (referred to herein generally as a decompression sensor) and retracts or slides downwardly from or within the cavity or bracket that encloses it. The varying pressures between the passenger cabin and the flight deck then rotates the decompression panel open allowing cabin and flight deck pressure to equalize. The downward release of the decompression panel allows the present invention to reduce weight and complexity compared to the prior art because it does not require additional armoring to prevent a ballistic threat at the gap (e.g, hinge) between the door panel and the decompression panel. Due to the nesting feature, there is no gap because the panel is nested within the door. The absence of a gap means that no additional armoring is needed to prevent a ballistic threat from penetrating the gap and entering the flight deck of the aircraft. Compared to the prior art, this reduces part count, complexity of design, weight and cost.

The present invention can be used in scenarios other than an aircraft. For example the invention can be used in other modes of transportation including but not limited to trains, cars, buses and vertical take-off and landing autonomous aircraft.

It will be appreciated by those of ordinary skill in the art that the various features outlined to achieve the sliding armored aircraft door decompression panel and system can be implemented individually or in combination without limitation.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 1:
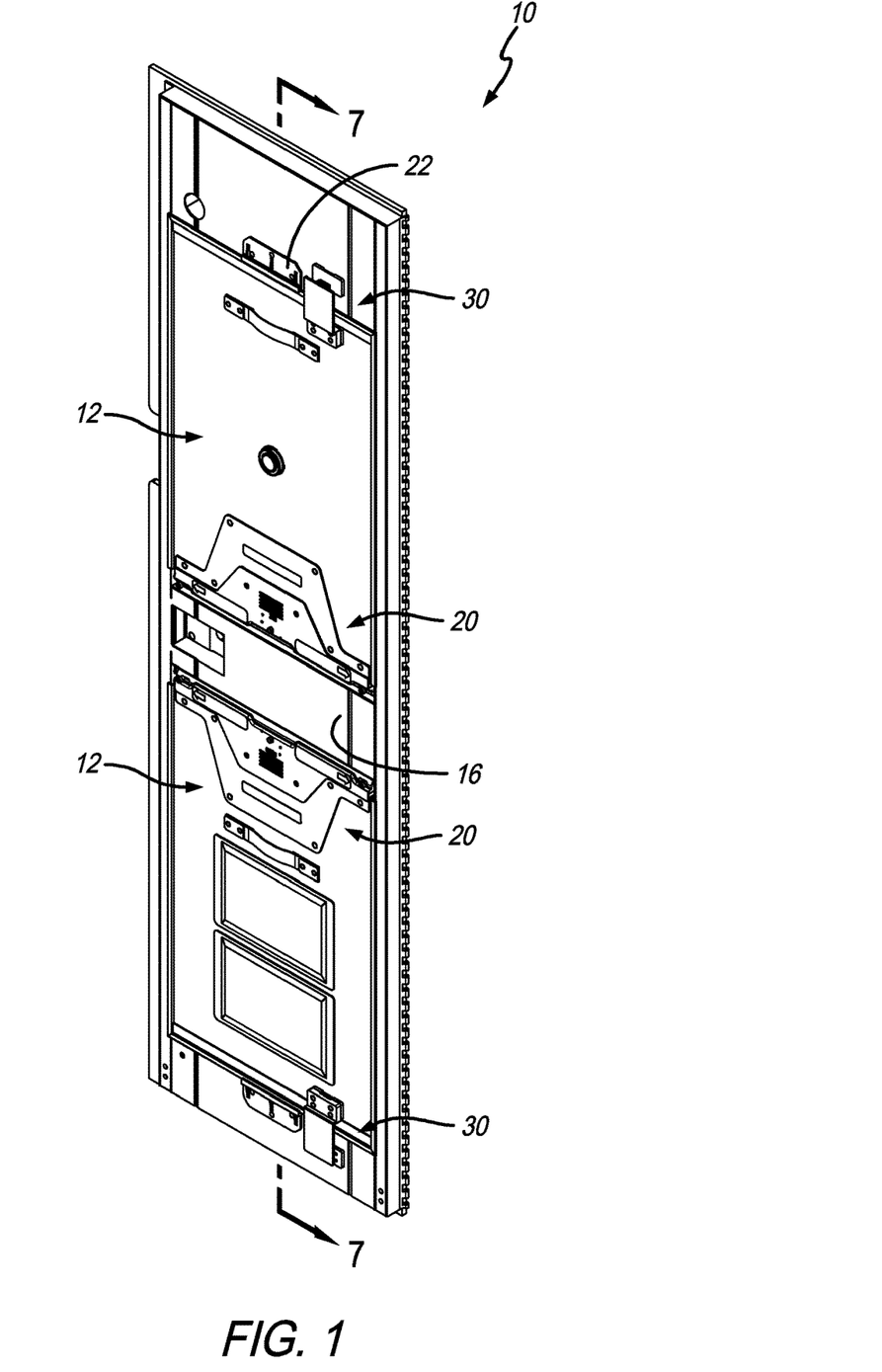
FIG. 1 is a front perspective view of a door assembly in accordance with a preferred embodiment of the present invention.
Figure 2:
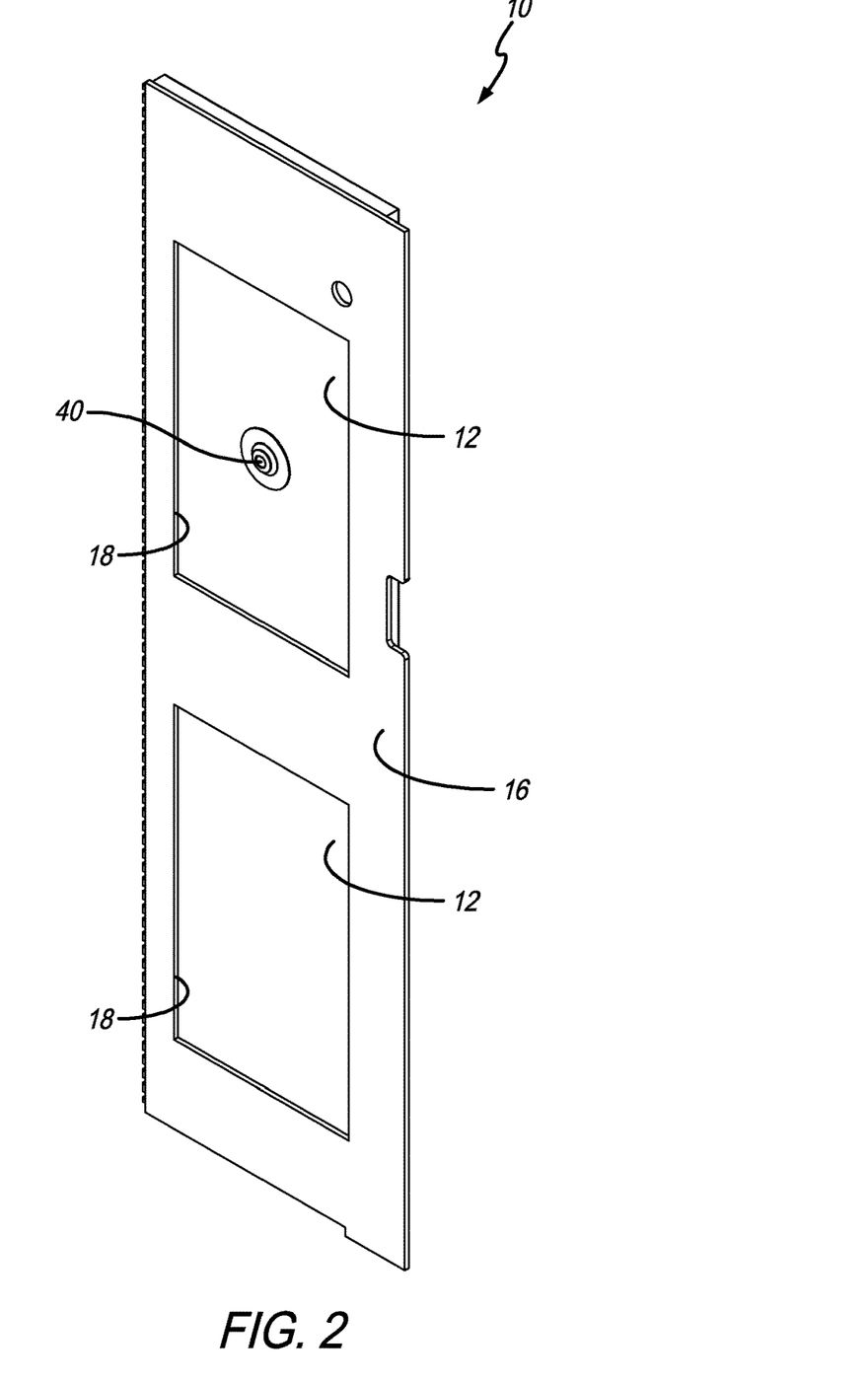
FIG. 2 is a rear perspective view of the door assembly of FIG. 1.

Referring now to the drawings, wherein the showings are for purposes of illustrating the present invention and not for purposes of limiting the same, FIGS. 1-10 show a door assembly 10. As shown in FIGS. 1-2, the door assembly 10 generally includes upper and lower or first and second decompression panel assemblies 12 that are housed within a main door portion 16. The main door portion 16 includes first and second decompression openings 18 defined therethrough.

Figure 3:
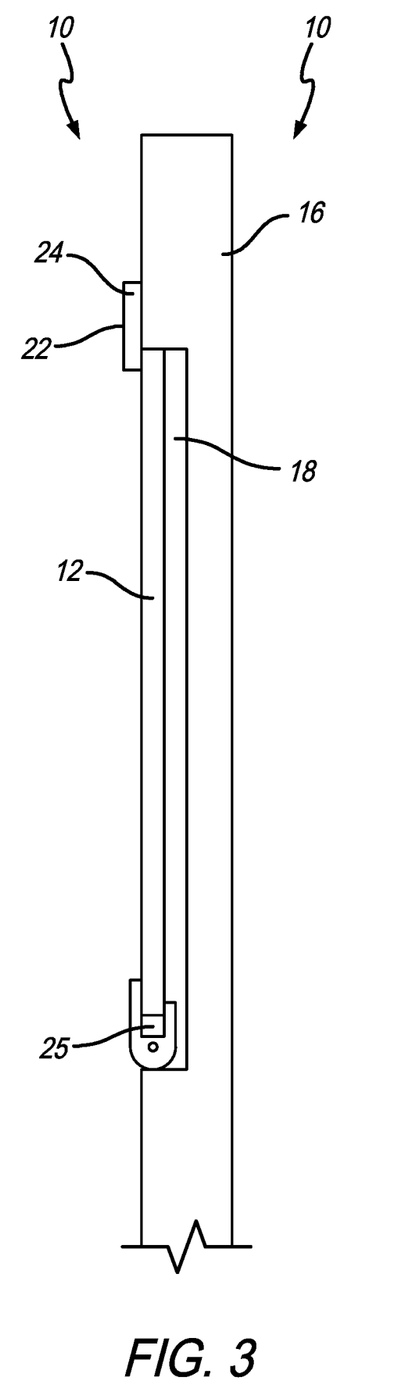
FIG. 3 is a schematic side sectional view of a door assembly showing the decompression panel assembly in the first position.
Figure 4:
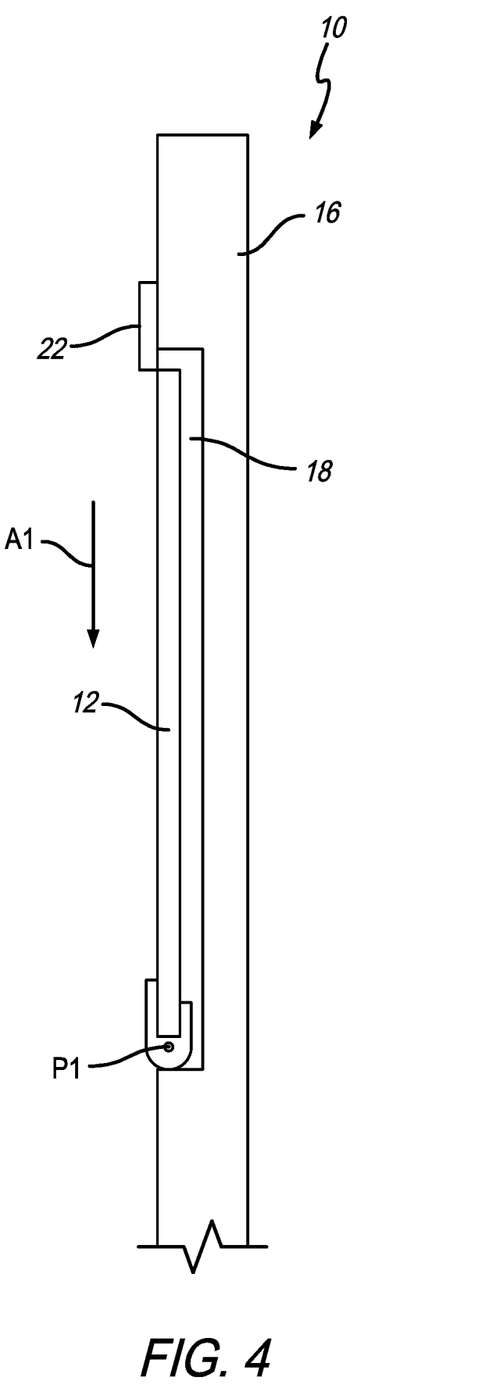
FIG. 4 is a schematic side sectional view of a door assembly showing the decompression panel assembly in the second position.
Figure 5:
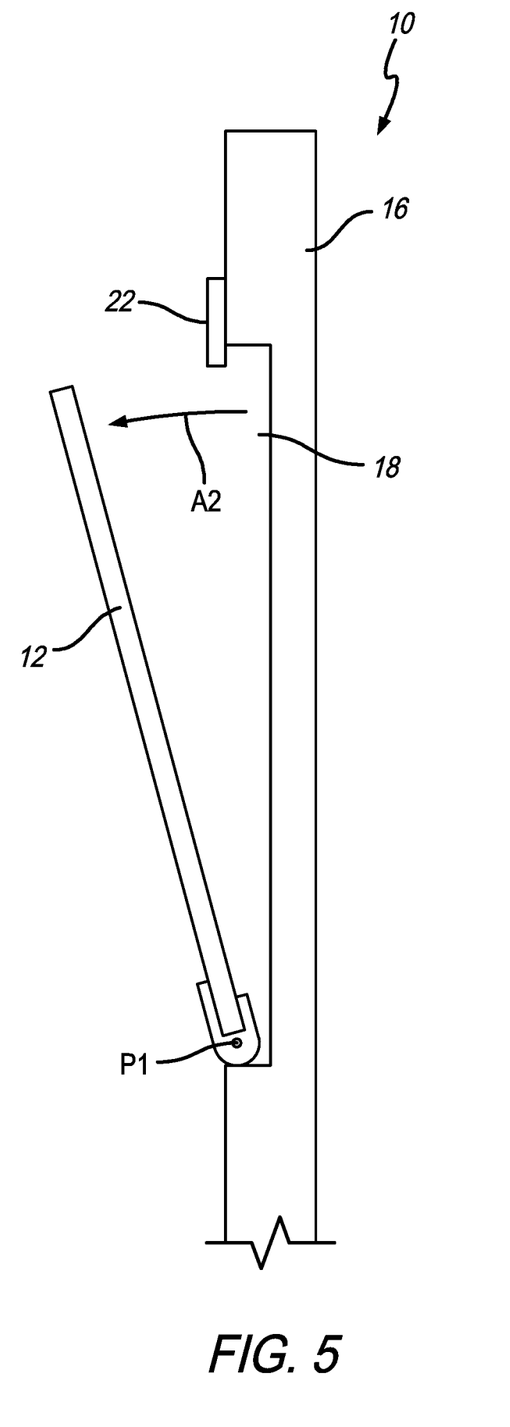
FIG. 5 is a schematic side sectional view of a door assembly showing the decompression panel assembly in the third position.

FIGS. 3-5 show a simplified version of the door assembly 10 that includes a first decompression panel assembly 12 nested or housed within the main door portion 16 and positioned in the first decompression opening 18. As shown in FIGS. 3-5, the first and second decompression panel assemblies 12 are movable between a first or normal position, a second or decompression event position and a third position or equalization/open position. The first and second decompression panel assemblies 12 slide linearly (e.g., the first decompression panel slides down and the second decompression panel slides up) from the first position (FIG. 3) to the second position (FIG. 4) and then rotate or pivot about a pivot axis P1 from the second position to the third position (FIG. 5). Using the first decompression panel assembly 12 as an example, in use, movement from the first position to the second position occurs when a decompression event occurs. As shown in FIG. 3, a gap 25 is defined between the bottom of the first decompression panel assembly 12 and the component therebelow. In FIG. 3, the component therebelow is a portion of a hinge assembly that will be described further hereinbelow. However, in other embodiments, the component therebelow may be the main door portion 16 or any other component. Once the first decompression panel assembly 12 is in the second position, because the panel assembly 12 has cleared a catch bracket 22, the difference in pressure between the air (or other gas) in the compartment on one side of the door (e.g., the cockpit) and the air (or other gas) in the compartment on the other side of the door (e.g., the cabin) pushes the first decompression panel assembly 12 open and rotates it to the third position so that the pressure in the two compartments is equalized. The door assembly 10 can include one or more decompression panels.

Arrow A1 in FIG. 4 indicates the sliding path the first decompression panel assembly 12 follows when moving from the first position to the second position and arrow A2 in FIG. 5 indicates the rotational opening path the first decompression panel assembly 12 follows when moving from the second position to the third position.

In a preferred embodiment, the door assembly 10 includes a plurality of overlapping ballistic panels 24 so that when the first decompression panel assembly 12 is in the first position bullets are not able to penetrate the door. As shown in FIGS. 3-5, the catch bracket 22 can be a ballistic panel 24. In the embodiments shown in the other figures, the catch bracket 22 is separate from the ballistic panels 24.

Figure 6:
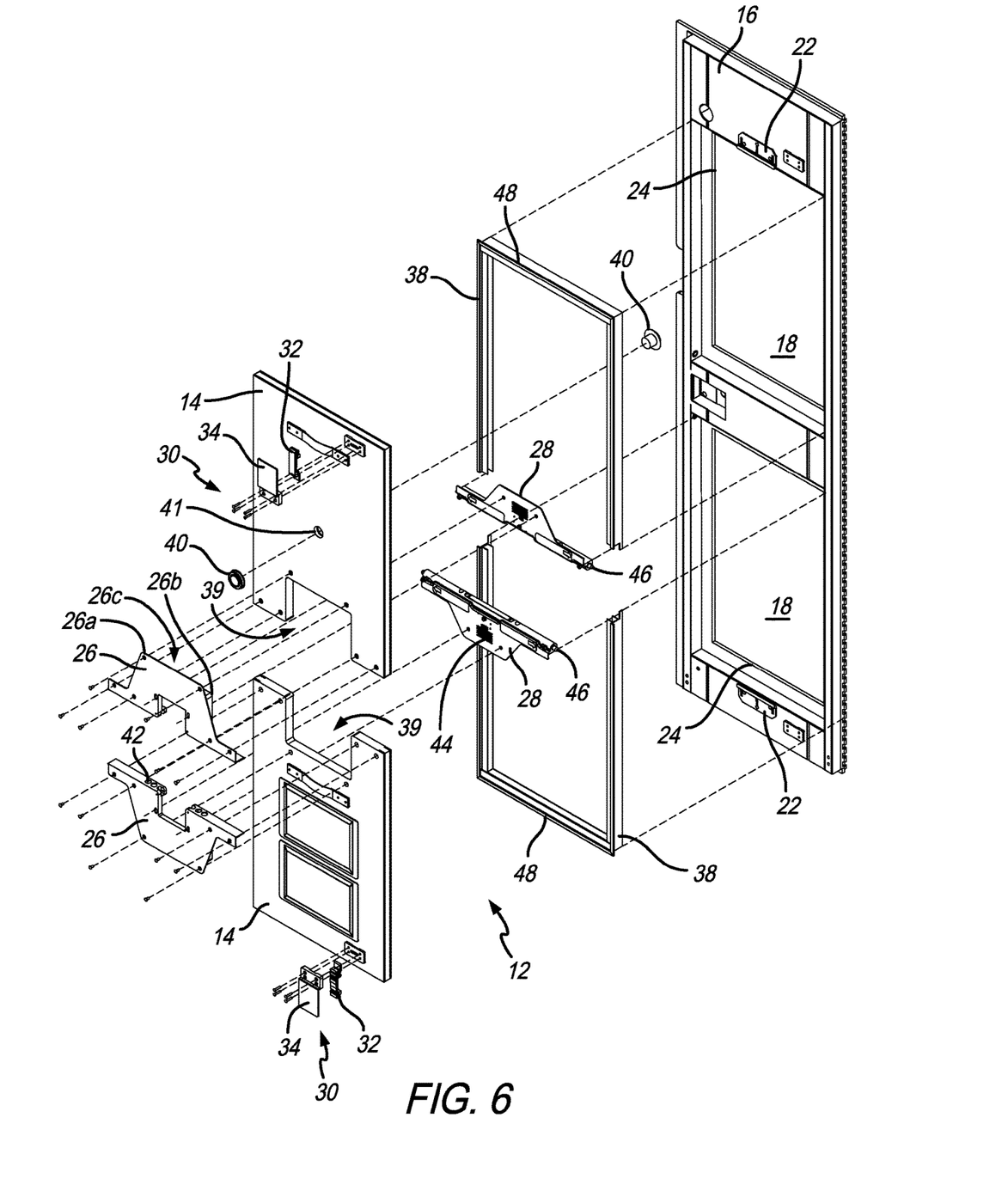
FIG. 6 is an exploded perspective view of the door assembly.

FIGS. 1-2 and 6-10 show an exemplary implementation of a door assembly 10 in accordance with a preferred embodiment of the present invention. The components described above are all present in this embodiment. As shown in FIG. 6, the first and second decompression panels 12 include first and second panel portions 14, respectively, and a trim portion 38. Each decompression panel 12 also preferably includes first and second hinge assemblies 20 that each include an inner hinge portion 26 and an outer hinge portion 28. The inner hinge portion 26 includes front and rear plates 26*a* and 26*b* that define a space 26*c* therebetween that receives a portion of the first panel member 14 therein. The first panel member 14 includes a recess 39 defined therein. The inner hinge portion 26 includes one or more springs 42 and a decompression sensor 44 that are housed in the coinciding portion of space 26*c* and recess 39. The decompression sensor 44 senses a decompression event and the spring(s) 42 move the first panel member 14 from the first position to the second position when the decompression event is sensed. It will be appreciated that the decompression sensor can be any device or component that senses a decompression event. Also, the decompression sensor does not have to be located within the door assembly, but can be located elsewhere. The type is not a limitation on the present invention. In a preferred embodiment, the first panel member 14 is biased toward the second position. In other words, the spring(s) 42 are normally in tension when the panel is in the first position and when the decompression event occurs, the spring(s) pull or move the panel to the second position.

Figure 7:
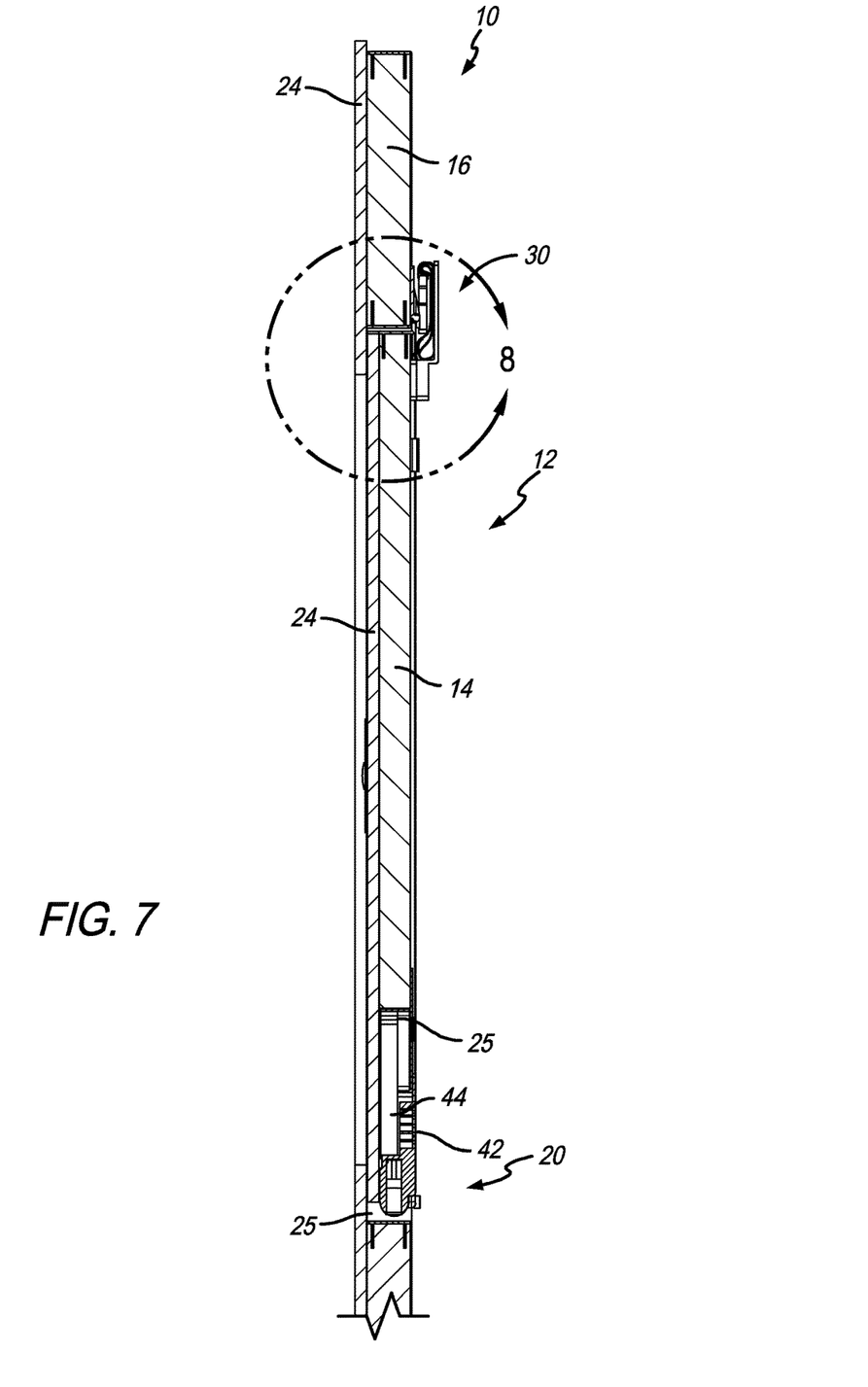
FIG. 7 is a side cross-sectional view of a portion of the door assembly.
Figure 9:
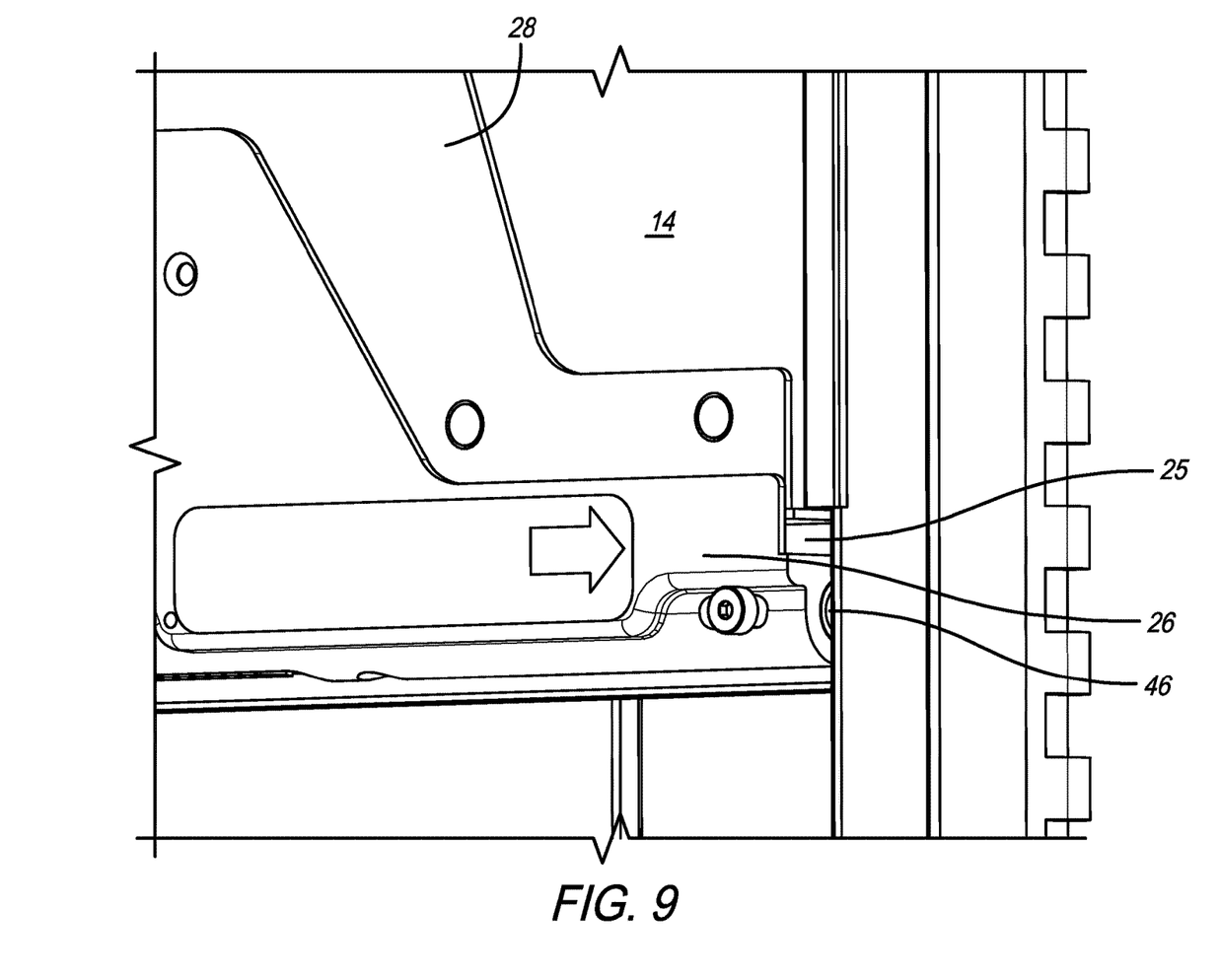
FIG. 9 is a close-up perspective view of a portion of the door assembly showing the gap that is closed when the panel is opened.
Figure 10:
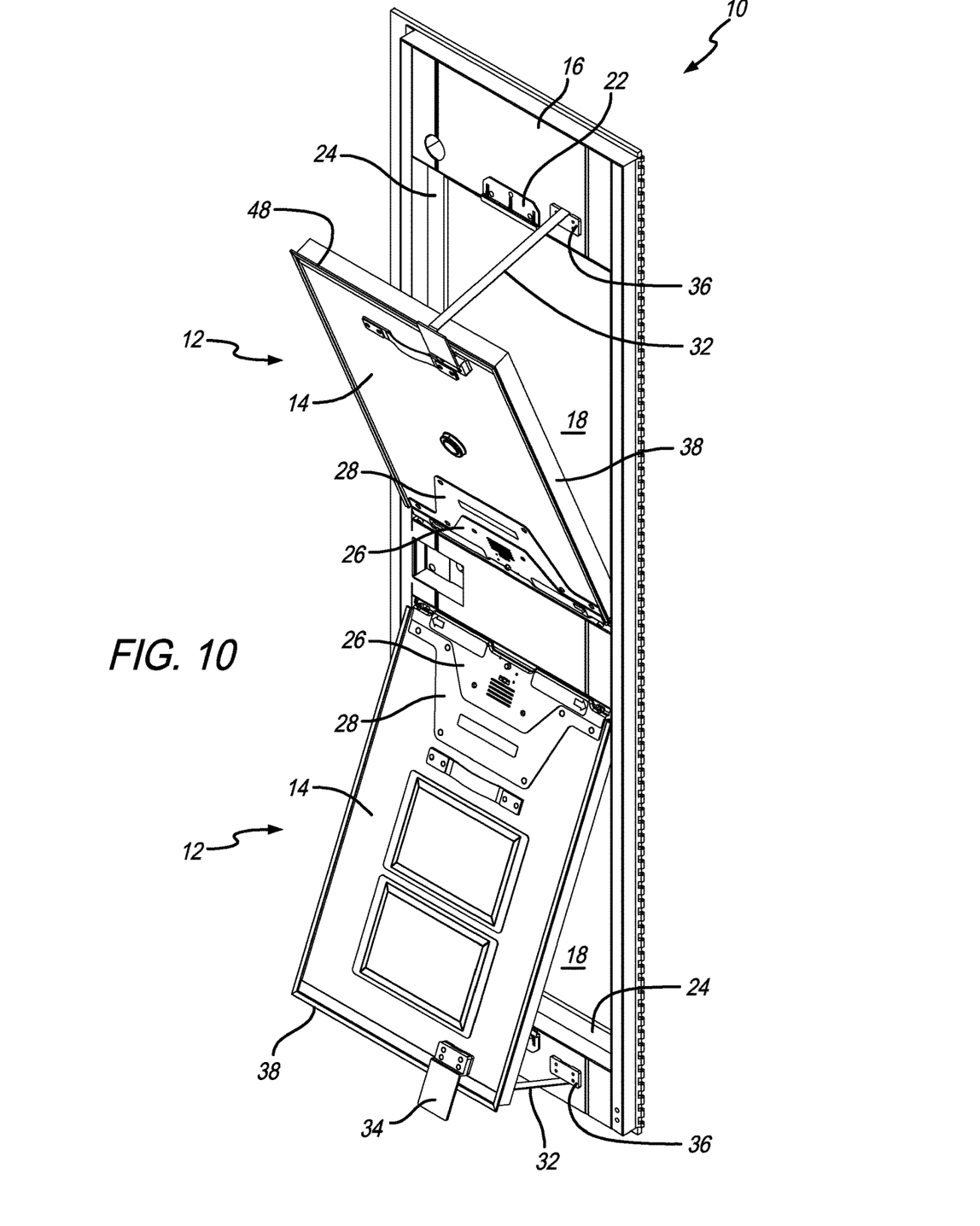
FIG. 10 is a perspective view of the door panel with both panel assemblies in the open or third position.

As shown in FIGS. 7 and 9, the inner hinge portion 26 is positioned adjacent the outer hinge portion 28. When the first panel member 14 moves from the first position to the second position, the inner hinge portion 26 moves together with the first panel member 14 relative to the outer hinge portion 28, which does not slide. This movement causes gap 25 to close. Next, as shown in FIG. 10, the first panel member 14 (and the trim portion 38) together with the inner and outer hinge portions 26 and 28 (i.e., the entire first decompression panel 12) rotate from the second position to the first position. The outer hinge portion 28 includes pivot pins 46 extending outwardly therefrom that are received in openings in the main door portion 16. The pivot pins allow the first decompression panel assembly 12 to pivot from the second position to the third position.

It will be appreciated that the second decompression panel assembly 12 operates the same as the first decompression panel assembly 12 and therefore, all discussion of the first decompression panel assembly 12 equally applies to the second decompression panel assembly 12.

Figure 8:
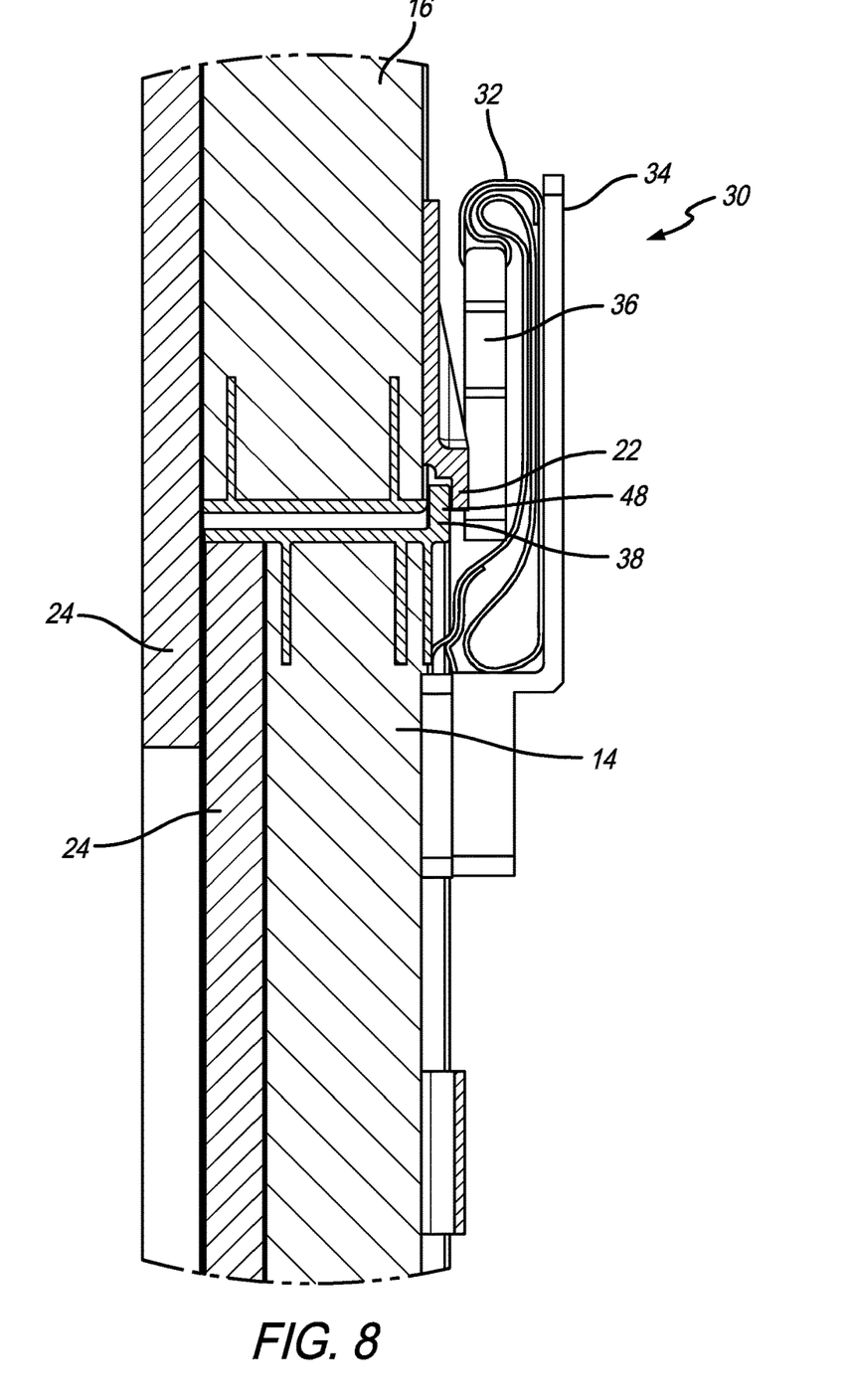
FIG. 8 is a cross-sectional view of a portion of the door assembly taken along line 8-8 in FIG. 7.

As shown in FIGS. 6-8, in a preferred embodiment, the first and second decompression panels assemblies 12 also include a strap assembly 30 that prevents the decompression panel assemblies from opening past a certain angle. In a preferred embodiment, the strap assembly 30 includes a lanyard or strap 32, and inner and outer securement members 36 and 34. As shown best in FIG. 8, The inner securement member 36 is secured or attached to the main door portion 16 and the outer securement member 34 is secured or attached to the first panel member 14 and the opposite ends of the strap 32 are secured to the inner and outer securement members 36 and 34. FIG. 10 shows the strap 32 holding the first and second decompression panels 12 in the third position. This prevents the decompression panels 12 from opening too far and injuring anyone (e.g., the pilot) in the cockpit or area behind the door assembly 10.

FIG. 8 also shows the catch 22 securing the first decompression panel assembly 12 in the first position. In a preferred embodiment, the trim portion 38 includes a lip 48 extending outwardly therefrom (upwardly in FIG. 8). The catch 22 extends outwardly (downwardly in FIG. 8) in the opposite direction as the lip. The two components overlap and this prevents the first decompression panel assembly 12 from pivoting open, as described generally above with respect to FIGS. 3-5. In another embodiment, the lip can be omitted and another portion of the first decompression panel assembly 12, e.g., the first panel member 14 or the trim 38 can be the component blocked by the catch 22 to prevent opening.

As shown in FIG. 6, the door assembly 10 preferably also includes a peephole assembly 40 that extends through an opening 41 defined in the first decompression panel assembly 12. FIGS. 1-2 and 6-10 also show a plurality of ballistic panels 24 throughout the door assembly 10. For example, FIG. 7 shows that a ballistic panel 24 is attached to one face of the first panel member 14. FIG. 6 shows ballistic panels 24 extending around the first and second decompression openings 18. As is discussed above, the ballistic panels 24 are positioned advantageously to prevent ballistic threats from compromising the door assembly 10 and allowing access to the cockpit.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A door assembly configured to be positioned between a first compartment and a second compartment, the door assembly comprising:
    a main door portion having a first decompression opening defined therein,
    at least a first panel portion positioned in a first position within the first decompression opening, wherein the first panel portion is movable linearly between the first position and a second position, wherein the first panel portion is biased toward the second position, wherein the first panel portion is hingedly associated with the main door portion and is pivotable between the second position and a third position, wherein in the third position the first compartment is in fluid communication with the second compartment via the first decompression opening, and
    a decompression sensor.

2. The door assembly of claim 1 wherein the first panel portion is configured to move from the first position to the second position when the decompression sensor senses a decompression event.

3. The door assembly of claim 2 wherein the first panel portion includes a free end and a pivot end, wherein in the first position a gap is defined between the pivot end of the first panel portion and the main door portion, and wherein in the second position the gap is reduced.

4. The door assembly of claim 1 wherein the first panel portion is configured to move from the second position to the third position due to the difference in pressure between the first and second compartments.

5. The door assembly of claim 1 wherein the door assembly includes a catch, and wherein when the first panel portion moves from the first position to the second position the first panel portion clears the catch thereby allowing the first panel to pivot from the second position to the third position.

6. The door assembly of claim 1 wherein the first panel portion is biased toward the second position.

7. The door assembly of claim 1 wherein the door assembly includes a strap assembly that includes a strap having first and second opposite ends, wherein the first end is secured to the main door portion and the second end is secured to the first panel portion, and wherein the strap maintains the first panel portion at an angle that is less than 90 degrees when the first panel portion is in the third position.

8. The door assembly of claim 1 wherein the first panel portion is part of a first decompression panel assembly, wherein the first decompression panel assembly includes a hinge assembly that includes an inner hinge portion and an outer hinge portion, wherein the inner hinge portion is secured to the first panel portion, wherein when the first panel portion moves from the first position to the second position, the inner hinge portion moves with the first panel portion and the outer hinge portion does not move.

9. The door assembly of claim 8 wherein when the first panel portion and inner hinge portion pivot from the second position to the third position, the outer hinge portion also pivots.

10. A door assembly configured to be positioned between a first compartment and a second compartment, the door assembly comprising:
   a main door portion having a first decompression opening defined therein,
   at least a first decompression panel assembly, wherein the first decompression panel assembly includes a first panel portion and a hinge assembly, wherein the hinge assembly includes an inner hinge portion and an outer hinge portion, wherein the inner hinge portion is secured to the first panel portion, wherein the first panel portion is positioned in a first position within the first decompression opening, wherein the first panel portion is movable linearly between the first position and a second position and is pivotable between the second position and a third position, wherein the first panel portion is biased toward the second position, wherein in the third position the first compartment is in fluid communication with the second compartment via the first decompression opening,
   a catch,
   a decompression sensor, wherein the first panel portion is configured to move from the first position to the second position when the decompression sensor senses a decompression event, wherein when the first panel portion moves from the first position to the second position, the inner hinge portion moves with the first panel portion and the outer hinge portion does not move, wherein when the first panel portion and inner hinge portion pivot from the second position to the third position, the outer hinge portion also pivots, and wherein when the first panel portion moves from the first position to the second position the first panel portion clears the catch thereby allowing the first panel to pivot from the second position to the third position, and
   a strap assembly that includes a strap having first and second opposite ends, wherein the first end is secured to the main door portion and the second end is secured to the first panel portion, and wherein the strap maintains the first panel portion at an angle that is less than 90 degrees when the first panel portion is in the third position.

11. The door assembly of claim 10 wherein the first panel portion includes a free end and a pivot end, wherein in the first position a gap is defined between the pivot end of the first panel portion and the main door portion, and wherein in the second position the gap is reduced.

12. A method of providing pressure equalization between first and second compartments separated by a door assembly, the method comprising the steps of:
   (a) obtaining the door assembly, wherein the door assembly includes a main door portion having a first decompression opening defined therein, at least a first panel portion and a decompression sensor, wherein the first panel portion is positioned in a first position within the first decompression opening,
   (b) wherein the decompression sensor senses a decompression event,
   (c) wherein the first panel portion slides to a second position, and
   (d) wherein the first panel portion pivots to a third position such that the first compartment is in fluid communication with the second compartment via the first decompression opening.

13. The method of claim 12 wherein step (c) occurs due to the difference in pressure between the first and second compartments.

14. The method of claim 12 wherein the door assembly includes a catch, and wherein step (c) occurs after the first panel portion clears the catch.

15. The method of claim 12 wherein the first panel portion is biased toward the second position.

16. The method of claim 12 wherein the first panel portion includes a free end and a pivot end, wherein in the first position a gap is defined between the pivot end of the first panel portion and the main door portion, wherein in the second position the gap is reduced.

17. The method of claim 12 wherein the door assembly includes a strap assembly that includes a strap having first and second opposite ends, wherein the first end is secured to the main door portion and the second end is secured to the first panel portion, and wherein the strap maintains the first panel portion at an angle that is less than 90 degrees when the first panel portion is in the third position.

18. The method of claim 12 wherein the first panel portion is part of a first decompression panel assembly, wherein the first decompression panel assembly includes a hinge assembly that includes an inner hinge portion and an outer hinge portion, wherein the inner hinge portion is secured to the first panel portion, wherein when the first panel portion moves from the first position to the second position, the inner hinge portion moves with the first panel portion and the outer hinge portion does not move.

19. The method of claim 18 wherein when the first panel portion and inner hinge portion pivot from the second position to the third position, the outer hinge portion also pivots.

* * * * *